(No Model.)
T. HENDERSON.
GREASE TRAP.
No. 535,901. Patented Mar. 19, 1895.
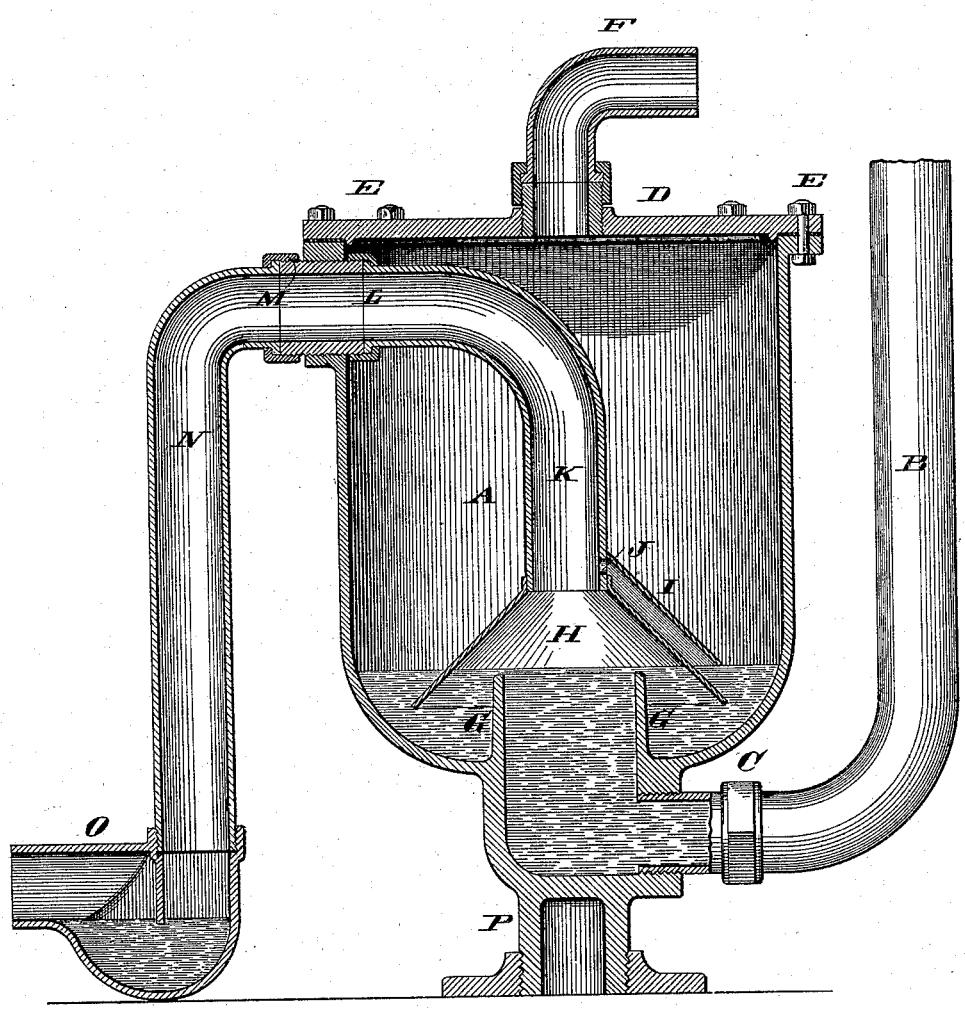
Attest:
Inventor:

UNITED STATES PATENT OFFICE.

THOMAS HENDERSON, OF TYLER, TEXAS, ASSIGNOR TO THE N. O. NELSON MANUFACTURING COMPANY, OF ST. LOUIS, MISSOURI.

GREASE-TRAP.

SPECIFICATION forming part of Letters Patent No. 535,901, dated March 19, 1895.

Application filed August 6, 1894. Serial No. 519,603. (No model.)

*To all whom it may concern:*

Be it known that I, THOMAS HENDERSON, a citizen of the United States, residing at Tyler, in the county of Smith and State of Texas, have invented a new and useful Grease-Trap, of which the following is a specification.

My invention relates to improvements in grease-traps in which the grease is designed to be removed from the trap automatically and the object of my invention is to cause the water passing through the trap to carry the grease out with it substantially in the manner hereinafter described, reference being had to the annexed drawing making part of this specification, which represents a vertical cross section of my device except the inlet or flushing pipe which is represented partly in cross section and partly in perspective.

The parts referred to by the letters of reference are as follows:

A, represents a reservoir. I prefer to make it cylindrical in form as shown and to provide it with a removable cover, but the form is not essential and if desired the cover may be fastened permanently in place.

B represents an inlet pipe connected with the trap at its lower end, and at its other end directly or indirectly with a sink or other source of waste water supply which should be located at least as high as the bend in the siphon hereinafter described.

C represents a joint by means of which the flushing pipe is connected with the trap.

D represents the cover of the reservoir A.

E, E, represent bolts by means of which the cover, D, is fastened in place.

F represents an air inlet and outlet pipe.

G represents a chamber into which the flushing water passes from the pipe B and through which it passes to the reservoir A. Its sides preferably extend upward within the reservoir A to a point above the bottom of the reservoir substantially as shown, and I prefer to make the chamber G larger in diameter than the inlet pipe B in order to diminish the force with which the water would otherwise enter the reservoir A. I do not desire however that either of these features of the chamber G as shown in the drawing should be understood when my claims are read, to be essential features of that chamber except where they are particularly specified.

H, represents the funnel shaped mouth of the short leg K of a siphon. I prefer in constructing my trap that the mouth H of the siphon should extend below the mouth of the chamber G and that the latter should extend upward within it substantially as shown. The special form of mouth (H) of the siphon shown in the drawings is not essential but the inlet through which the water passes into the reservoir A should be as small as, or smaller than the mouth of the short leg of the siphon and should open directly beneath or within it and should preferably be smaller than the siphon's mouth and extend up into it.

I, represents a pipe communicating with the short leg K of the siphon at a point above its mouth through the opening J. This pipe is a vacuum breaking device and it is designed to stop the action of the siphon whenever the water in the reservoir A descends low enough to allow air to pass up into the pipe I. The lower end of the pipe I is located above the point where the mouth H ends and opens at about the level at which the water in the trap is designed to stand when lowest.

I prefer to use a vacuum breaking device in connection with the siphon but such a device is not essential as my improved trap operates well without it.

K, is the short leg of the siphon.

L, M, represents a joint.

N, represents the long leg of the siphon.

O, represents a trap at the lower end of N.

P, represents a base upon which the device rests.

The operation of my device is as follows: The water from the sink or other source of supply passes down the pipe B to the chamber G. The chamber G being larger in diameter than the flushing pipe B, the water passes through it more gently than it does through the pipe and enters the reservoir A, at reduced speed. The mouth of the chamber G, being located within the mouth of the short leg K of the siphon the water passes primarily into the siphon's mouth and the grease being lighter than the water floats to the surface within the mouth of the siphon, while part of the water rises directly upward in the siphon and part descends and then passes up into the space in the reservoir A, surrounding the short leg of the siphon. As more water is introduced into the trap the grease within the mouth of the siphon floats upward higher and higher and continues to be retained within the siphon while the water separated from the grease continues to rise partly in the siphon and partly in the space around it. This continues until the water begins to overflow into the long leg N of the siphon. If at that time a large enough supply of water is furnished to substantially fill the siphon it is at once started into action. Where the water enters gradually the water overflowing through the siphon passes down the long leg N, carrying the grease collected in the siphon with it. It also carries part of the imprisoned air with it and out through the tap O until the vacuum formed, is sufficiently perfect to cause the siphon to begin to suck the water out of the reservoir A. In either case the action of the siphon continues after being initiated until the water reaches a point low enough to permit of air entering the short leg of the siphon through the vacuum breaker I, or in case no vacuum breaking device is provided through the mouth H of the siphon. As soon as the vacuum is broken by the entering air, the operation of the siphon stops. This operation is repeated as often as the reservoir A is filled. By reason of the comparatively large supply of water collected in the reservoir A before the siphon action is initiated, the siphon is well washed out at each operation. The air inlet and outlet pipe F enables the air in the reservoir A to escape as water enters and prevents the creation of a vacuum within the reservoir by enabling air to enter when the water is pumped out by the siphon.

I do not desire to confine my claims to the particular forms of the elements therein specified shown in my drawing but wish to cover all equivalents. Where I speak in general terms of the water inlet through which water enters the trap discharging admitted water up into the mouth of the short leg of the siphon, I mean to include combinations in which the inlet performs this function regardless of whether the sides of the inlet extend up within the mouth of the siphon or not. Though such upward extension of the sides of the inlet is desirable, it is not essential.

Having fully described my invention, what I claim, and desire to secure by Letters Patent, is—

1. In a grease trap the combination of a reservoir, a siphon the mouth of whose short leg opens downward within said reservoir and a water inlet discharging admitted water up into the mouth of the short leg of the siphon, substantially as described.

2. The combination of a reservoir, a siphon the mouth of whose short leg opens downward within the reservoir; and a water inlet whose sides extend up within the mouth of the siphon and above the bottom of the reservoir.

3. In a grease trap, the combination of a reservoir, a siphon the mouth of whose short leg opens downward within said reservoir, a water inlet discharging admitted water, up into the mouth of the short leg of the siphon; and a trap at the lower end of the long leg of the siphon, substantially as described.

4. The combination of a reservoir, a siphon, the mouth of whose short leg opens downward within the reservoir below the level at which the water in the reservoir stands after an operation of the siphon, an air passage connecting the interior of the siphon with the space in the reservoir surrounding it, and whose mouth is located at a higher level than the mouth of the siphon, a water inlet whose mouth opens within the mouth of said siphon and a flushing pipe extending from said inlet to a point above the bend in the siphon.

5. In a grease trap, the combination of a reservoir having an air inlet; a siphon, the mouth of whose short leg opens downward within said reservoir; a water inlet discharging admitted water up into the mouth of the short leg of the siphon; and means for admitting air to the short leg of the siphon from the reservoir, and breaking the vacuum in the siphon before the water in the reservoir sinks to the level of the mouth of the short leg of the siphon, substantially as described.

6. The combination of the reservoir A having an air inlet and outlet, the chamber G having a mouth extending upward within the reservoir above its bottom, a siphon, the mouth of whose short leg opens downward within the reservoir and surrounds the mouth of the chamber G, a vacuum breaker for breaking the vacuum in the siphon before the water in the reservoir sinks below the level of the lip of the mouth H, a trap at the lower end of the long leg N of the siphon, and a flushing pipe of smaller diameter than the chamber G, and extending to a point above the level of the bend in the siphon, substantially as described.

Witness my hand this 13th day of July, 1894.

THOS. HENDERSON.

Witnesses:
W. G. HUMAN,
J. B. HENDERSON.